United States Patent [19]

Eastman et al.

[11] 4,120,982
[45] Oct. 17, 1978

[54] HYDROXYPROPYLATED, EPICHLOROHYDRIN CROSSLINKED TAPIOCA STARCH DERIVATIVE FOR ACID RETORT MEDIA

[75] Inventors: James E. Eastman; Frank del Valle, both of Decatur, Ill.

[73] Assignee: A. E. Staley Manufacturing Company, Decatur, Ill.

[21] Appl. No.: 615,334

[22] Filed: Sep. 22, 1975

Related U.S. Application Data

[63] Continuation of Ser. No. 112,817, Feb. 4, 1971, abandoned.

[51] Int. Cl.$^2$ .............................. A23L 1/10; A23L 3/02
[52] U.S. Cl. ..................................... 426/405; 426/407; 426/661; 426/521; 127/70; 536/106
[58] Field of Search ....................... 260/233.3; 127/70; 426/658, 661, 392, 397, 399, 401, 407, 408, 506, 509, 521, 405; 536/106

[56] References Cited

U.S. PATENT DOCUMENTS

| | | | |
|---|---|---|---|
| 3,208,994 | 9/1965 | Flodin | 260/233.3 |
| 3,369,910 | 2/1968 | Ganz | 260/233.3 |
| 3,422,088 | 1/1969 | Tuschhoff | 260/233.3 |
| 3,437,493 | 4/1969 | Robinson | 260/233.3 |

*Primary Examiner*—Norman Yudkoff
*Attorney, Agent, or Firm*—Howard J. Barnett; Charles J. Meyerson

[57] ABSTRACT

A thin-thick, hydroxypropylated, epichlorohydrin crosslinked tapioca-based starch derivative for continuous process pressure cooking of acid food systems. The degree of crosslinking of this starch derivative is carefully controlled so that it is initially low in viscosity and develops full viscosity only under high pressure and temperatures. These characteristics make this starch derivative ideally suited for use in recently developed acid medium, food canning processes in which initial rapid heat penetration without degrading the starch derivative is necessary for the heat sterilization of the canned foods. For the new continuous retort processing, the usual time allowed for the complete retorting cycle is less than twenty minutes, and this must include heat sterilization. As the retort medium using the starch derivative of the invention reaches the heat sterilization temperature, it then increases in viscosity to a range which retains the canned food product in a desirable suspension. In addition, this starch derivative is non-gelling and freeze-thaw stable. This new derivative is also useful in making prepared foods which, although not subjected to retorting, are processed at high temperatures ranging from about 190° F. to about 230° F.

3 Claims, No Drawings

HYDROXYPROPYLATED, EPICHLOROHYDRIN CROSSLINKED TAPIOCA STARCH DERIVATIVE FOR ACID RETORT MEDIA

This is a continuation of application Ser. No. 112,817 filed Feb. 4, 1971.

DISCLOSURE OF THE INVENTION

This invention is directed to thin-thick, hydroxypropylated, epichlorohydrin-crosslinked tapioca based starch derivative which has an alkali fluidity in the range from about 68–98 cc. for a 3 gram starch sample, in 8 ml. $H_2O$ and 90 ml. of 0.375 N NaOH. The alkali fluidity test is used as a means of determining the proper degree of crosslinking during the reaction with epichlorohydrin. The hydroxypropylation substitution is usually done first, and the optimum range for the hydroxypropyl degree of substitution (d.s) is from about 0.085 to 0.30.

Before retorting these starch derivatives have a Brookfield viscosity less than about 1,100 cps. in a 7% d.s.b., sample, prepasted in a buffer solution. After retorting under pressure, and at temperatures up to 240° F., the Broofield viscosity is more than 3,000 cps., measured at a pH ranging from about 3 to nearly neutral. Thus it can be seen these starch derivatives have the pronounced "thin-thick" viscosity behavior needed for continuous retorting.

The modified starches of the invention are useful as thickeners in acid retort media such as canned pie fillings, soups, sauces and in other prepared foods utilizing continuous retort equipment or static sterilizers which require rapid heat penetration with good heat stability. These thin-thick starch derivatives allow rapid heat penetration while thin to facilitate product sterilization, and then thicken to the desired viscosity without degrading. Faster retorting is preferred, because holding foods at retort temperatures for long periods greatly reduces flavor. The recently developed continuous, high temperature food processing equipment requires a starch derivative which is initially low in viscosity, will allow rapid heat penetration to temperatures above 210° F. during retorting, and which will attain a final Brookfield viscosity above 3,000 centipoise after retorting at high temperatures. When conventional starches are used, they are either degraded due to acid or heat instability, or both, or the required temperature for the heat sterilization step of the process is never attained in the internal portion of the canned article being processed.

DESCRIPTION OF THE PRIOR ART

A modified starch derivative which exhibited some degree of thin-thick characteristics is described in U.S. Pat. No. 3,422,088, assigned to a common assignee herewith. The composition described in that patent includes phosphorus oxychloride to accomplish crosslinking. It has been found that the starch derivative described in the above patent is not stable at the elevated temperatures required for retort canning, because the crosslinking breaks down, and the starch becomes thick too soon at the periphery of the food mass, thereby preventing further heat penetration.

Crosslinking of the starch product of this invention is accomplished by a reaction with epichlorohydrin, and the characteristics of the resulting product differs from the phosphorus oxychloride derivative because our starch product is capable of thickening after rapid heating to a temperature of about 230° F. for less than 20 minutes. Under such temperature conditions, the modified starch of U.S. Pat. No. 3,422,088 tends to become unstable.

In high volume canning processes, the time saving made possible by our new product represents a substantial reduction in food processing costs, since it means that a substantially greater amount of perishable fruits or vegetables can be canned with less capital investment for processing equipment, even during peak volume production necessitated by the relatively brief harvest seasons for most fruits and vegetables. With the continuous retort process, no additional equipment or manpower is required, even during the peak volume canning periods.

Another method of modifying starch to obtain thin-thick behavior is described in U.S. Pat. No. 3,463,668. That patent is directed to a reaction of a glycine and a chlorine-containing oxidizing agent with a granular starch to obtain an inhibited product possessing labile crosslinkages. There is no disclosure here of heat penetration stability, and the patent disclosure indicates that maximum retort thickening of this product took about an hour and a half, much more time than for the new starch product of the subject invention, and certainly in excess of the time allowable for high volume, continuous retort canning processes. Some means of continued agitation during the prolonged thickening time would be required if this type of starch were used to keep the food particles in the can from settling to the bottom.

SUMMARY OF THE INVENTION

This invention provides a hydroxypropylated, epichlorohydrin crosslinked tapioca-based starch derivative having thin-thick viscosity characteristics under acid pH conditions ranging from about 3–5. This starch derivative also exhibits excellent heat penetration when slurried for use in a retort media, which makes it peculiarly suited for continuous retort (pressure cooking) canning processes in which the initial low viscosity, high heat penetration characteristic allows rapid heat sterilization of the sealed mixture of retort medium and canned food, and in which the retort medium thereafter thickens substantially to maintain the canned food in suspension. The product has a hydroxypropyl d.s. of about 0.085–0.30, which is carefully balanced with a degree of crosslinking (evidenced by alkali fludity tests) to give an initial Brookfield viscosity before retorting below about 1,100 cps., and a final viscosity of above about 3,000 cps. after retorting at retort temperatures up to 240° F.

Retort media made from this hydroxypropylated, epichlorohydrin crosslinked tapioca starch derivative do not degrade when subjected to the rapid heating required for the sterilization procedure, and thicken well in acid food systems. Tapioca is bland in taste, and this starch derivative is particularly useful for combining with acid food which have delicate flavors. It is believed that the unusually high degree of crosslinking with epichlorohydrin, evidenced by an alkali fluidity ranging from 68–98 ml. for a 3 gm. sample provides the excellent acid stability observed.

The tapioca starch derivative of the invention was found to have a hydroxypropyl degree of substitution (d.s.) per anhydroglucose unit of 0.085 to 0.3. d.s., with the preferred range being from 0.1 to 0.2. The degree of hydroxypropyl substitution is controlled by monitoring the extent to which the pasting temperature is depressed during the reaction. A pasting temperature range of about 148° F.–158° F. indicates the correct range of substitution.

The use of epichlorohydrin as a crosslinking agent is preferred, because it is acceptable as a food additive having no toxic reaction byproduct, and because it is believed that the other linkages obtained through use of this reagent are more stable than other types of linkages, such as ester linkages and acetyl type linkages. The amount of crosslinking is also carefully controlled by monitoring the alkali fluidity of the reaction mixture, and by neutralizing with acid as soon as an alkali fluidity ranging from about 68–98 cc., measured on 3 gm. starch, d.s.b., in a 100 ml. solution is obtained. The reaction is stopped at this point since it has been found that this particular degree of crosslinking combined with the above hydroxypropyl degree of substitution will produce a starch derivative having the necessary viscosity behavior under acid pH conditions.

The following detailed description of the invention is intended to illustrate the preferred mode of practicing the invention. To appreciate the information set forth, some description of the test equipment is believed helpful.

The apparatus used for obtaining the information recorded in the following examples was designed to duplicate on a smaller scale the process environment for a typical continuous retorting system. Comparisons of these tests with performance tests on actual continuous retorting equipment has confirmed the accuracy of the observations made with the laboratory equipment.

The test equipment used to obtain the data reported in the examples included a mineral oil bath, controlled heat input means for maintaining the bath at the required temperature range (about 190°–260° F.), and oscillatable conveyor means for moving the individual test cans through the oil bath. Thermocouples for recording internal food mass temperatures are provided to be inserted in each test can, and have pressure sealing means for the external connection. A thermocouple is also provided to record the oil bath temperature. Each can sample weighed about 300 grams, since the test cans were number "one" size (about 300 ml.).

The individual cans filled with the start retort media were clamped to the conveyor means, and the thermocouples inserted. The oil bath temperature control was set for a bath temperature of about 240° F., plus or minus about 2° F., and the filled test cans were immersed in the heated oil bath, and rotated about 210° in one direction, and then in the opposite direction at a total speed of about 20 rpm. for a time period of about 20 minutes. Temperatures inside each can were recorded automatically and were noted as indicated in the examples. The slurries used in these tests were mixed to duplicate the food canner's typical acid canning medium requirements.

The alkali fluidity test referred to herein was found to be the most convenient means of controlling the degree of crosslinking and is accomplished with the same equipment in all the examples given. The test is generally described in U.S. Pat. No. 3,238,193 at the paragraph bridging columns 7 and 8. The concentration of the alkaline starch dispension for a particular test sample is determined by adding 90 ml. of 0.375 N sodium hydroxide to a slurry of neutralized, filtered, water-washed wet starch cake containing 3 grams of the starch derivative, dry solids basis (d.s.b.). The sample is slurried in water to make 10 ml. of total water prior to the addition of 90 ml. of 0.375 N sodium hydroxide. After mixing the starch slurry with the sodium hydroxide solution, the suspension is stirred at between 450 and 460 rpm. for 3 minutes in order to paste the starch. The resulting starch solution is poured into a fluidity funnel having a specific water time between about 30 and 40 seconds. The number of ml. of starch solution which flows through the funnel is the "water-time" (defined below) is the alkali fluidity of the starch. The extent of crosslinking is monitored by repeating the above test at regular intervals with samples taken from the reaction mixture. When the alkali fluidity test is within the desired range, the crosslinking reaction is stopped.

The fluidity funnel used for the alkali fluidity tests described herein comprises two main parts, a funnel body and a funnel tip threadably attached thereto. A simple plunger-type, tapered valve on a glass stem can be used to manually control flow through the funnel orifice. The funnel parts are precision-machined from stainless steel stock, and polished to very smooth surfaces on all parts which come in contact with the test samples.

The funnel body defines a generally cone shaped vessel having a 60° angle (or taper) between opposite, converging funnel walls. Funnel body height is sufficient to hold at least a 100 ml. sample, and a 0.277 inch orifice and fluid passage is provided at the narrowest portion of the funnel for attachment to the funnel tip. The fluid passage is 1½ inches in length from the orifice to the narrow end of the funnel body. The opposite, wide orifice of the funnel body is oriented upwardly, and the tapered valve is inserted downwardly from above into the smaller orifice during the tests. Operation of this valve against the "water-time" of the funnel gives the test readings. The funnel tip is a cup shaped member, which is threadably received on the narrow end of the funnel body. The internal chamber of the funnel tip is hemispherical and has a 3/16 inch diameter with a lower central opening of 0.070 inch which is 0.0492 inches in length. The total height from the lower end of the funnel body passage to the lower external orifice of the funnel tip includes the height of the ball chamber (0.1008 inches) and the length (0.0492 inches) of the funnel tip opening.

The composite apparatus described above is vertically disposed above a graduated cylinder for the actual tests. At the beginning of each test, the "water-time" for the apparatus is checked by running 100 ml. of pure water through the funnel and recording the total elapsed time. The "water-time" then becomes the time against which each sample is tested.

The flow through the funnel during the "water-time" is measured in milliliters and recorded after each test. The funnel is thoroughly washed between each test to avoid irregular observations. The above alkali fluidity test procedure was followed throughout the tests, using a 3 gm., d.s.b. starch derivative sample.

The following examples illustrate the method of practicing the invention:

EXAMPLE 1

Three 2 liter flasks were each charged with 856 g. (750 g. d.s.b.) of tapioca starch in 1,019 g. of water. To each slurry, 37.5 g. of anhydrous $Na_2SO_4$ and 88.5 g. of $Na_3PO_4 12 H_2O$ was added. Thirty minutes thereafter, 60 g. of propylene oxide was added, and reacted for 23 hours at about 100° F. Then 1.5% (weight/volume) aqueous epichlorohydrin solution was added to each flask to give 0.026, 0.030 and 0.034% epichlorohydrin, respectively (d.s.b. starch weight basis). The three slurries were adjusted to pH 5.5 after 6.5 hours, then filtered, washed with 3 volumes of water and oven dried overnight at 46°–48° C. Bostwick viscosity and heat penetration data were taken from these samples and compared to a commercial acetylated waxy maize based canner's starch tested under the same conditions and the results are set forth in Table I immediately below:

TABLE 1

| CAN Sample | % d.s.b. Starch | Retort Time (min.) | Bostwick Viscosities (3.5 pH) | | | | Temperature (° F.) at/minute | | | | |
|---|---|---|---|---|---|---|---|---|---|---|---|
| | | | 5 | 15 | 30 | 60 sec. | 5 | 10 | 13 | 15 | 17 |
| 1 | 8 | 10 | 2.1 | 3.6 | 4.4 | 5.1 | 165 | 193 | — | — | — |
| 2 | 8 | 13 | 1.5 | 2.5 | 3.2 | 3.9 | 165 | 193 | 207 | — | — |
| 3 | 8 | 15 | 1.5 | 2.6 | 3.3 | 4.1 | 165 | 193 | 207 | 214 | — |
| 4 | 8 | 17 | 1.8 | 2.8 | 3.4 | 4.0 | 165 | 193 | 207 | 214 | 218 |
| 5 | 7 | 13 | 3.5 | 4.8 | 5.6 | 6.5 | 172 | 224 | 236 | — | — |
| 6 | 7 | 15 | 4.5 | 5.7 | 6.6 | 7.5 | 172 | 224 | 236 | 239 | — |
| 7 | 7 | 17 | 4.8 | 6.0 | 6.9 | 7.8 | 172 | 224 | 236 | 239 | 240 |
| Commercial Canner's Starch (Comparison): | | | | | | | | | | | |
| 8 | 7 | 17 | 2.7 | 3.5 | 4.1 | 4.4 | 168 | 170 | 174 | 179 | 185 |

The alkali fluidity for the above samples 1–7 ranged from 68 to 98 ml. for 3 gram samples.

As can be seen from Table I, the modified starches of Example 1 (in Can Samples 1–7) exhibited much better heat penetration characteristics than the commercial canner's starch used for comparison. For Example, Can Sample 4 reached 193° F. after only 10 minutes, while the commercial canner's starch (Can Sample 8) had reached only 170° F. over the same period of time, and only 185° F. after 17 minutes. The same Sample 4 was used in retort blueberry pie fillings with excellent results, showing unusually good heat penetration at pH 3.5. The internal can temperature after 15 minutes was 207° F., which is sufficient for complete thermophile destruction (heat sterilization). The canned goods were later inspected for consistency, appearance and taste (by a select taste panel). The rating for the product was an overall excellent. It should be noted that in Samples 1, 2, 5 and 6 the retort time was 10, 13, 13 and 15 minutes, respectively, so there was no temperature readings after that time period had expired.

In comparing the above examples, it can be seen that the modified starches made according to the invention gave excellent results in testing, and are, therefore, preferred thin-thick hydroxypropylated, epichlorohydrin crosslinked starches for use in acid media continuous retort canning processes which require a high initial heat penetration of the fluid starch medium, such as blueberry pie filling. Heat penetration is best at low viscosity levels, but the starch viscosity is maintained high enough to support the food pieces being canned while avoiding splattering during can filling. After the heat sterilization step, the starch medium, when used at an initial concentration of about 7% d.s.b. starch is pH 3.5 buffer solution, thickens to a Brookfield viscosity of about 4,000 cps., Brookfield viscosity, which effectively maintains the canned food in suspension.

The Bostwick viscosity data recorded in Table I indicates that the samples made according to the invention were entirely acceptable for use as retort media in acid food systems. Samples 2, 3, and 4 were particularly good in this regard. The Bostwick viscosity for commercial canner's starch, sample 8 was good, but it must be noted that this sample did not attain a temperature of more than 185° F. throughout the 17 minute time period for which the internal mass temperature of the samples were recorded. Attaining a temperature in the food mass of at least 210° F. within 20 minutes is believed necessary for successful thermophile sterilization of the food product.

EXAMPLE 2

The tapioca starch derivative made according to the method of Example 1 was used to make blueberry pie filling for 17 minutes retorting time at a retort bath temperature of 255° F. A comparison mix of the same blueberry pie recipe was made up, except that a commercial modified waxy maize canner's starch was used. The pH was adjusted in each case with citric acid to a pH of about 3.5–4.5. The heat penetration rate for the two samples was observed by recording the internal mass temperatures inside the cans during retorting. The temperatures were as follows:

| | Temperature (° F.) | Temperature |
|---|---|---|
| Time (min.) | Tapioca Starch Derivative | Commercial Modified Waxy Maize |
| 0 | 70 | 70 |
| 5 | 165 | 168 |
| 10 | 193 | 170 |
| 13 | 207 | 174 |
| 15 | 214 | 179 |
| 17 | 218 | 185 |

It can be seen from the above temperature data that the tapioca-based starch derivative had an excellent heat penetration characteristic ideally suited to continuous retort canning processes in which a temperature of at least 210° F. must be attained in less than 20 minutes. The commercial canner's starch did not exhibit sufficient heat penetration to be used under the high-temperature continuous retort conditions outlined above.

In summary, the tapioca based, hydroxypropylated, epichlorohydrin crosslinked starch derivative of the invention is ideally suited for use in acid food systems having a pH ranging from 3–5 because of its thin-thick viscosity behavior. The preferred degree of substitution of hydroxypropyl units ranges from 0.085–0.30, and more particularly, from about 0.1 to 0.2, and a high degree of crosslinking with epichlorohydrin is believed necessary to obtain the required acid stability in acid retort media. This range has been controlled best by running alkali fluidity tests on 3 gm. samples during the crosslinking reaction. An alkali fluidity range of 68–98 is preferred.

In addition, the tapioca-based starch derivative of this invention is particularly useful for acid media retorting of foods having particularly delicate flavors. The resulting products retain very nearly all of the original flavor with no interference from the tapioca, and the short retort time at high temperatures because of the excellent heat penetration rate of the retort media also greatly aids in flavor retention of the retorted products.

Since many embodiments of this invention may be made and since many changes may be made in the embodiments described, the foregoing is interpreted as illustrative and the invention is defined by the claims appended hereafter.

We claim:

1. A method of continuous retort canning particularly adapted for canning bland or delicately flavored foods in an acid medium, the steps comprising:
    (a) preparing a 5–8% by weight dry solids aqueous slurry of a hydroxypropylated, epichlorohydrin crosslinked tapioca based starch derivative, said starch derivative having a degree of substitution of hydroxypropyl units of about 0.08–0.3 and having a level of crosslinking with epichlorohydrin sufficient to obtain an alkali fluidity ranging from 71–98 ml. for test sample containing 3 grams of the starch derivative in water to make 10 ml., plus 90 ml. of 0.375N NaOH;
    (b) combining said aqueous slurry with a food material;
    (c) adjusting the pH of said slurry to a range of 3–5;
    (d) disposing the aqueous starch slurry and the food material in a plurality of containers;
    (e) sealing said containers;
    (f) heating the starch slurry and food materials sealed in said containers to a temperature of at least 210° F. without degrading the starch derivative for a period of 8–20 minutes to effect sterilization of the starch slurry and food materials sealed in said containers; and
    (g) simultaneously moving said containers with agitation while heating to effect a uniform suspension of the food materials throughout the starch slurry after heating.

2. The method of claim 1, in which the starch slurry rapidly thickens while heating from a Brookfield viscosity of less than about 1,100 centipoise to a final Brookfield viscosity of at least about 4,000 centipose.

3. The method of claim 2, in which the starch derivative is sufficiently crosslinked to enable the internal mass of said starch slurry and food materials to attain a temperature of about 230° F. in less than 14 minutes at pH in the range of 3.0–3.5.

* * * * *